United States Patent
Kotani (10) Patent No.: US 10,789,025 B1
(45) Date of Patent: Sep. 29, 2020

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventor: Yoshihide Kotani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/533,806

(22) Filed: Aug. 7, 2019

(30) Foreign Application Priority Data

Mar. 11, 2019 (JP) .................................. 2019-043548

(51) Int. Cl.
*G06F 3/12* (2006.01)

(52) U.S. Cl.
CPC .......... *G06F 3/1236* (2013.01); *G06F 3/1203* (2013.01); *G06F 3/1231* (2013.01); *G06F 3/1232* (2013.01); *G06F 3/1292* (2013.01)

(58) Field of Classification Search
CPC .... G06F 3/1236; G06F 3/1237; G06F 3/1261; G06F 3/1203; G06F 3/1231; G06F 3/1232; G06F 3/1292
See application file for complete search history.

(56) References Cited

U.S. PATENT DOCUMENTS

| 2017/0228198 | A1* | 8/2017 | Koormamtharayil ........................ G06F 3/1204 |
| 2017/0351463 | A1* | 12/2017 | Panda .................... G06F 3/1229 |
| 2018/0292962 | A1* | 10/2018 | Choi ...................... G06F 3/0488 |

FOREIGN PATENT DOCUMENTS

| JP | 2014006646 | 1/2014 |
| JP | 2014032599 | 2/2014 |
| JP | 2018063579 | 4/2018 |

* cited by examiner

*Primary Examiner* — Moustapha Diaby
(74) *Attorney, Agent, or Firm* — JCIPRNET (57) ABSTRACT

An information control apparatus includes a storage unit storing, for each user, results of use of respective functions of devices and a display control unit performing control so as to preferentially display a device to be used next among the devices based on a pattern group having patterns close to one another and including continuous function values when the pattern group is present in a case where the user-specific use result is represented by a function axis indicating a function value including the used function and a setting value thereof and a time axis indicating a time of use of the device.

20 Claims, 8 Drawing Sheets

| USER ID | DATE AND TIME OF USE | DEVICE NAME | FUNCTION | SETTING VALUE | FILE NAME | ... |
|---|---|---|---|---|---|---|
| U001 | 2018. OMONTH. ODAY 10:00 | PRINTER A | PRINT | A4 | BILL A | ... |
| | 2018. OMONTH. ODAY 10:12 | PRINTER A | PRINT | A3 | BILL A | ... |
| | 2018. OMONTH. ODAY 10:20 | PRINTER A | SCAN | WHITE/BLACK | BILL A | ... |
| | 2018. OMONTH. ODAY 13:00 | PRINTER A | PRINT | A4 | BILL B | ... |
| | 2018. OMONTH. ODAY 13:30 | PRINTER B | Fax | – | BILL B | ... |
| | 2018. △MONTH. △DAY 10:20 | PRINTER A | PRINT | A4 | BILL C | ... |
| | 2018. △MONTH. △DAY 10:35 | PRINTER A | PRINT | A3 | BILL C | ... |
| | 2018. △MONTH. △DAY 11:20 | PRINTER A | SCAN | WHITE/BLACK | BILL C | ... |
| | 2018. △MONTH. △DAY 13:50 | PRINTER A | PRINT | A4 | BILL D | ... |
| | 2018. △MONTH. △DAY 13:55 | PRINTER B | Fax | – | BILL D | ... |
| | 2018. □MONTH. □DAY  9:50 | PRINTER A | PRINT | A4 | DOCUMENT E | ... |
| | 2018. □MONTH. □DAY 10:00 | PRINTER A | PRINT | A3 | DOCUMENT E | ... |
| ... | ... | ... | ... | ... | ... | ... |

FIG. 5

| PREDICTED TIME | PATTERN GROUP | OPERATION HISTORY RANKING | FUNCTION VALUE | RECOMMENDED DEVICE RANKING |
|---|---|---|---|---|
| 10:00 | FOR FIRST TIME (FIRST PATTERN GROUP 132a) | PATTERN 131a PATTERN 131c PATTERN 131e | COPY A4 COPY A3 SCAN | PRINTER A PRINTER C |
| 13:00 | FOR SECOND TIME (SECOND PATTERN GROUP 132b) | PATTERN 131b PATTERN 131d | COPY A4 Fax | PRINTER B PRINTER D |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-043548 filed Mar. 11, 2019.

BACKGROUND

(i) Technical Field

The present invention relates to an information processing apparatus and a non-transitory computer readable medium storing a program.

(ii) Related Art

In recent years, a search device for searching for a multifunction printer on a network has been proposed (see, for example, JP2014-006646A).

The search device described in JP2014-006646A searches for a multifunction printer on a network having at least one of a copy function, a scan function, or a facsimile function and a print function. The search device has an acquisition unit acquiring information related to a job history stored in the multifunction printer in association with user identification information, a determination unit determining the display order of the identification information of the multifunction printer based on information (such as operation history information) other than the information related to a print job history among the information related to the job history associated with the specific user identification information, and a display control unit displaying the identification information of the multifunction printer on a display screen in accordance with the display order determined by the determination unit.

SUMMARY

A frequently used device is not always appropriate for processing to be performed next.

In addition, depending on processing, some devices are capable of executing the processing and some devices are incapable of executing the processing.

Aspects of non-limiting embodiments of the present disclosure relate to an information processing apparatus and a non-transitory computer readable medium storing a program allowing a device appropriate for processing to be performed next to be preferentially displayed in a case where processing is performed more than once in chronological order.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

An information processing apparatus includes a storage unit storing, for each user, results of use of respective functions of a plurality of devices and a control unit performing control so as to preferentially display a device to be used next among the plurality of devices based on a pattern group having a plurality of patterns close to one another and including a plurality of continuous function values when the pattern group is present in a case where the user-specific use result is represented by a function axis indicating a function value including the used function and a setting value thereof and a time axis indicating a time of use of the device.

BRIEF DESCRIPTION OF THE DRAWINGS

Exemplary embodiment(s) of the present invention will be described in detail based on the following figures, wherein:

FIG. 8(a) is a diagram illustrating an example of a printing object, and FIG. 8(b) is a diagram illustrating an example of a recommendation screen.

DETAILED DESCRIPTION

Hereinafter, an embodiment of the present invention will be described with reference to accompanying drawings.

In the drawings, components having substantially the same functions are denoted by the same reference numerals without redundant description.

[Summary of Embodiment] An information control apparatus according to the present embodiment is provided with a storage unit storing, for each user, the results of use of the respective functions of a plurality of devices and a display control unit performing control so as to preferentially display the device to be used next among the plurality of devices based on a pattern group having a plurality of patterns close to one another and including a plurality of continuous function values when the pattern group is present in a case where the user-specific use result is represented by a function axis indicating a function value including the used function and a setting value thereof and a time axis indicating the time of use of the device.

Figure 1:
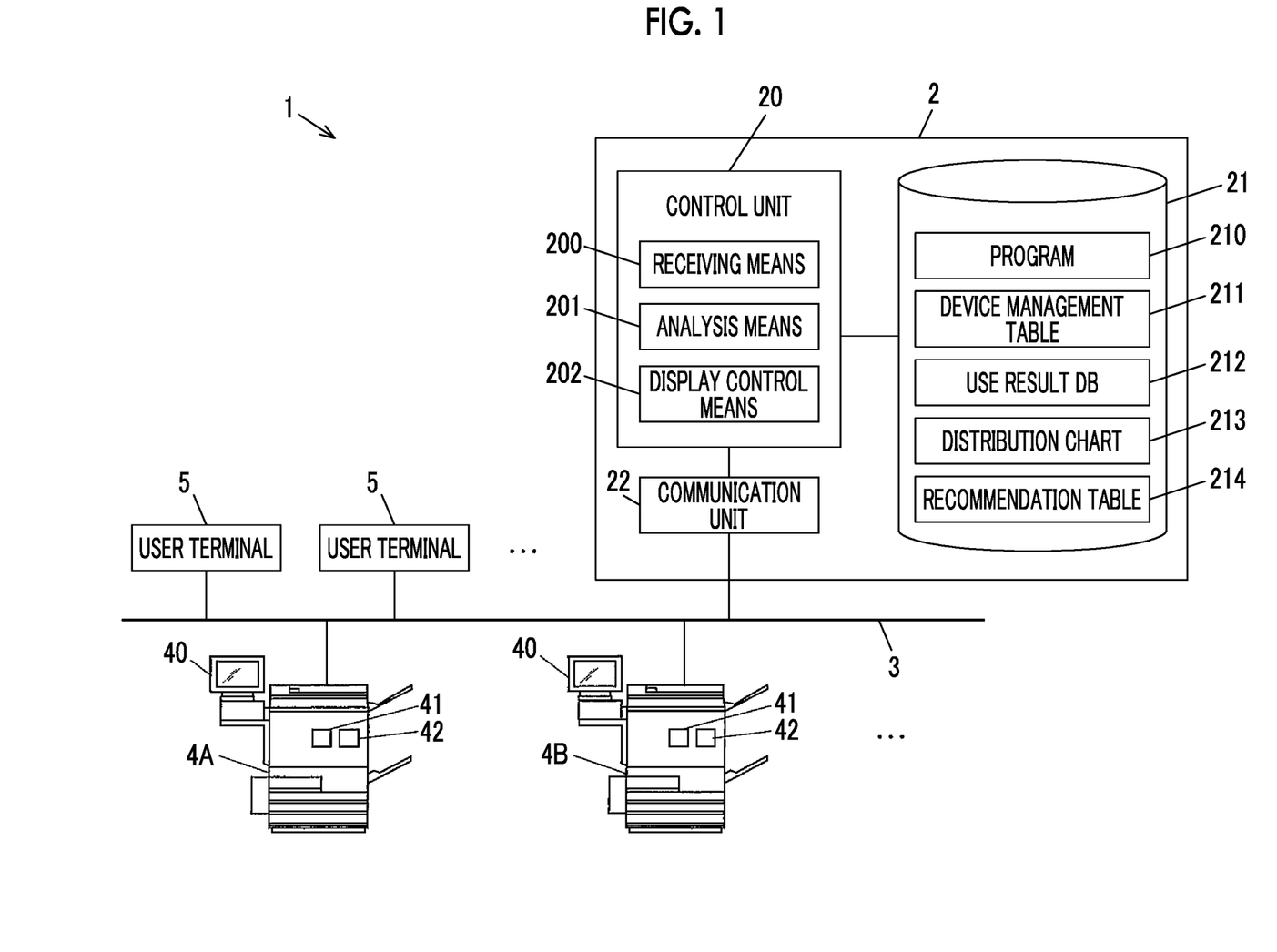
FIG. 1 is a block diagram illustrating a configuration example of an information processing system according to an embodiment of the present invention.

[Embodiment] FIG. 1 is a diagram illustrating a configuration example of an information processing system according to the embodiment of the present invention.

This information processing system 1 is provided with an information processing apparatus 2, a plurality of devices 4A and 4B (also referred to as "device 4" when the devices 4A and 4B are collectively referred to), and a plurality of user terminals 5 used by a user. The devices 4A and 4B and the user terminals 5 are connected to the information processing apparatus 2 via a network 3.

The user is an example of a user.

The network 3 is a communication network such as a local network (LAN) and the Internet.

(Configuration of Device) The device 4 is provided with an operation display unit 40, an aggregation unit 41, and a control unit 42.

The device 4 is an image forming device having a plurality of functions (also referred to as processing) such as scanning, printing, copying, electronic mailing, and faxing.

The device 4 may be an image forming device having a single function such as a printer and a facsimile.

The device 4 is not limited to the image forming devices and may be a device such as a personal computer (PC), a multi-function mobile phone (smartphone), and a tablet terminal.

The operation display unit 40 has a configuration in which a touch panel is superimposed on a display such as a liquid crystal display, displays various information such as a recommendation screen, and receives a user operation.

The aggregation unit 41 aggregates job execution results, that is, information indicating the situation of use of the device 4 (such as the function, the setting value, and the number of printed sheets) for each user and transmits aggregation information to the information processing apparatus 2 as a periodic notification at a set time.

In a case where a job is transmitted from the user terminal 5, the control unit 42 executes the job by using a necessary function.

In a case where a job is designated by the operation display unit 40 being operated, the control unit 42 executes the job by using a necessary function.

(Configuration of User Terminal) The user terminal 5 is, for example, a personal computer (PC).

The user terminal 5 may be a mobile communication terminal such as a multi-function mobile phone (smartphone) or the like.

The user terminal 5 is provided with a display unit realized by a liquid crystal display and the like, an input unit realized by a keyboard, a mouse, and the like, a control unit realized by a central processing unit (CPU), an interface, and the like and performing input control, display control, communication control, and the like, and a storage unit including a read only memory (ROM), a random access memory (RAM), a hard disk, and the like and storing various data such as a document and a non-transitory computer readable medium storing a program executed by the CPU.

The display unit and the input unit may be realized by, for example, a touch panel display in which the display unit and the input unit are integrated.

The non-transitory computer readable medium storing a program stored in a storage unit 21 includes a non-transitory computer readable medium storing a program for document creation, a Web browser, a mailer, and a printer driver, and the like.

A plurality of the printer drivers corresponding to the plurality of devices 4 connected to the network 3 are prepared.

Once a document such as a bill is created or selected by the input unit being operated and the printer driver is selected, the selected printer driver generates a job in accordance with the selected function and setting value and transmits the job to the device 4.

(Configuration of Information Processing Apparatus) The information processing apparatus 2 is provided with a control unit 20 controlling each unit of the information processing apparatus 2, the storage unit 21, and a communication unit 22.

The communication unit 22 communicates with the device 4 and the user terminal 5 via the network 3.

A central processing unit (CPU), an interface, and the like constitute the control unit 20.

The CPU functions as a receiving unit 200, an analysis unit 201, a display control unit 202, and the like by operating in accordance with a non-transitory computer readable medium 210 storing a program stored in the storage unit 21.

Each of the units 200 to 202 will be described in detail later.

The analysis unit 201 and the display control unit 202 are an example of a control unit.

Figure 7:
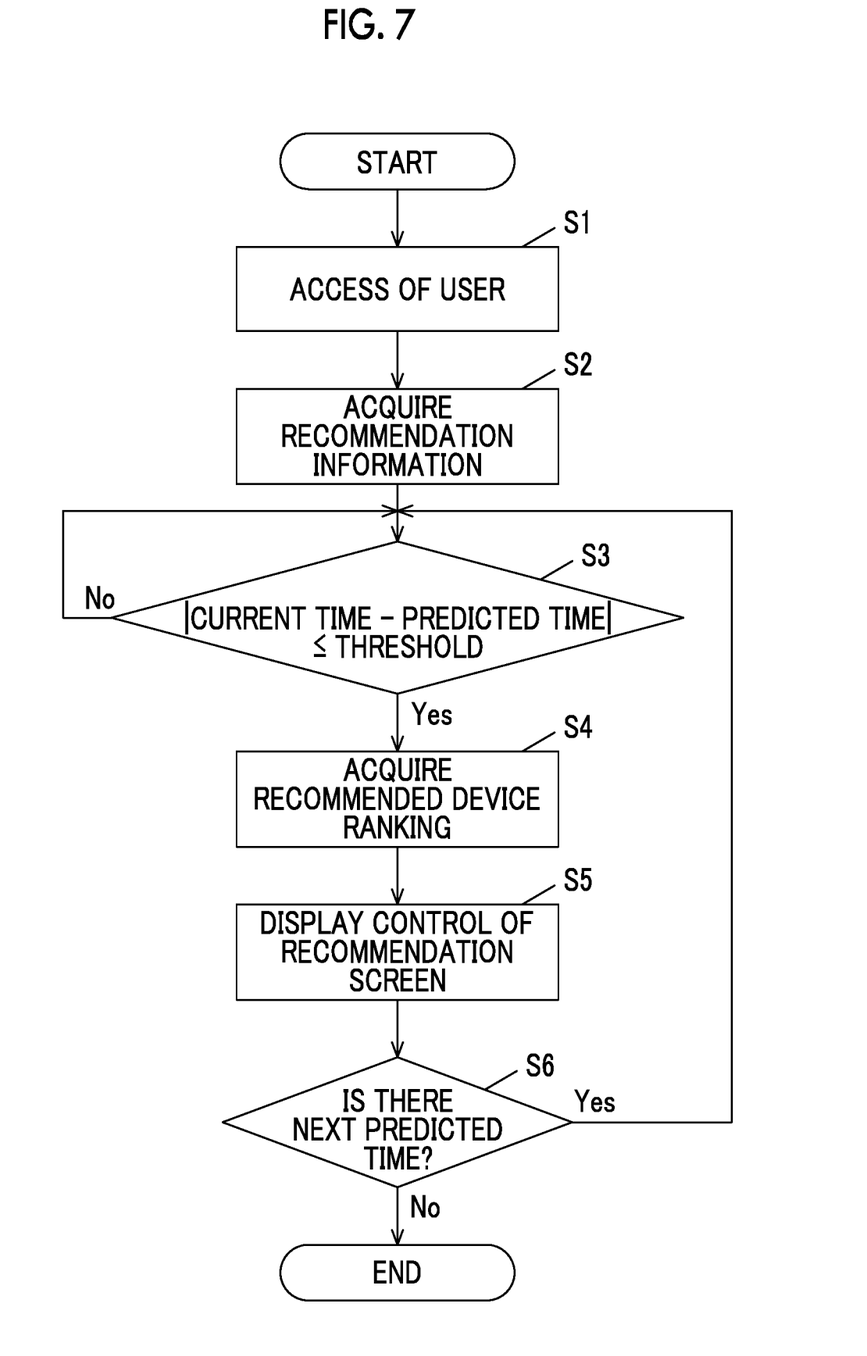
FIG. 7 is a flowchart illustrating an example of the operation of an information processing apparatus.

A read only memory (ROM), a random access memory (RAM), a hard disk, and the like constitute the storage unit 21. Stored in the storage unit 21 are various information such as the non-transitory computer readable medium 210 storing a program as illustrated in the flowchart of FIG. 7, a device management table 211 (see FIG. 2), a use result database (DB) 212 (see FIG. 3), a distribution chart 213 (see FIG. 4), and a recommendation table 214 (see FIG. 5).

The aggregation information is regularly transmitted every day from the aggregation unit 41 of the device 4. The aggregation information is received by the receiving unit 200 and recorded in the device management table 211.

The device management table 211 will be described in detail later.

The use result DB 212 is analyzed and recorded by the analysis unit 201 based on the aggregation information.

The use result DB 212 will be described in detail later.

The distribution chart 213 is analyzed by the analysis unit 201 based on the aggregation information recorded in the use result DB 212 and generated for each user ID.

The distribution chart 213 will be described in detail later.

The recommendation table 214 is analyzed and recorded by the analysis unit 201 based on the distribution chart 213.

The recommendation table 214 will be described in detail later.

Figure 2:
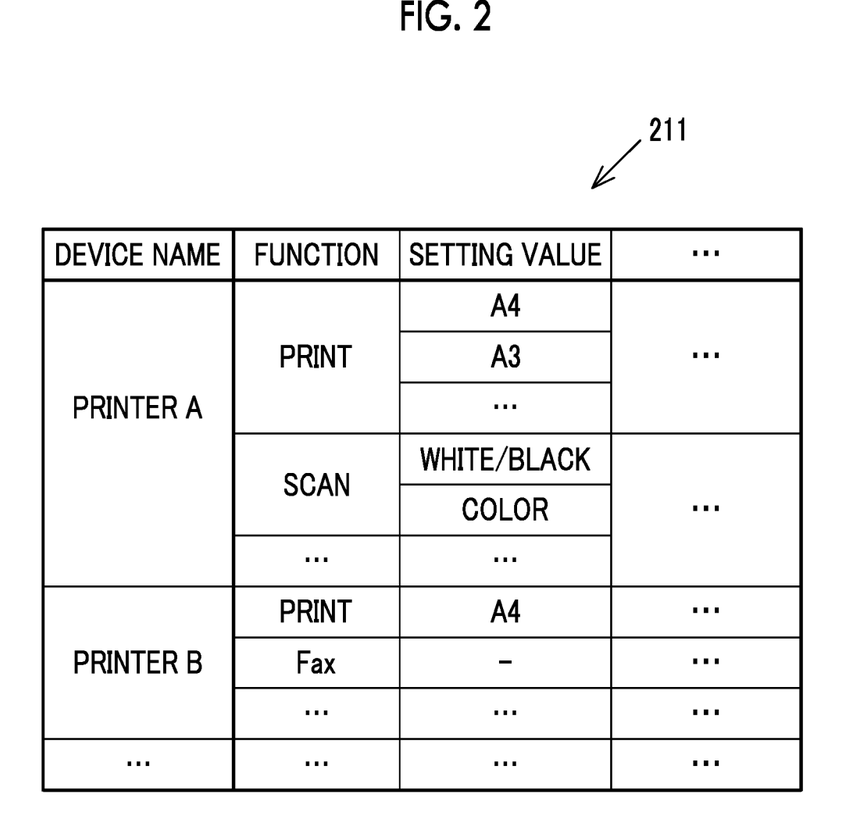
FIG. 2 is a diagram illustrating an example of a device management table.

FIG. 2 is a diagram illustrating an example of the device management table 211.

The device management table has items such as a device name, a function, and a setting value.

The name of the device 4 is recorded in the device name. In the case of the figure, a printer A and a printer B are recorded as the device name.

The device name may be replaced with a device ID for identifying the device 4.

The name of the function of the device 4 is recorded in the function.

The setting value set in accordance with the function is recorded in the setting value.

A function with a fixed setting value is also possible.

The device name of the device 4A illustrated in FIG. 1 is the printer A and the device name of the device 4B illustrated in FIG. 1 is the printer B.

Figure 3:
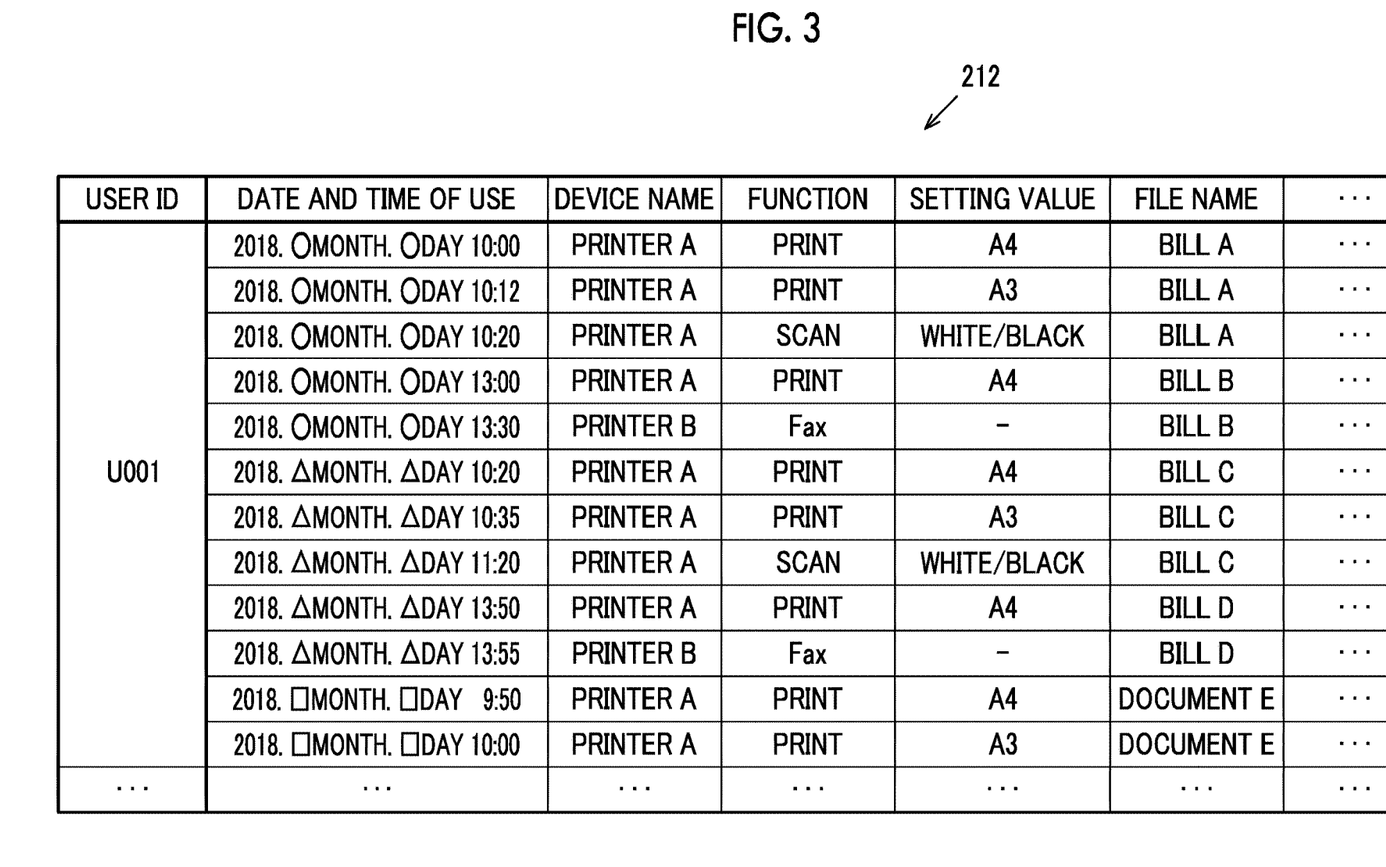
FIG. 3 is a diagram illustrating an example of a use result DB.

FIG. 3 is a diagram illustrating an example of the use result DB 212.

The use result DB 212 has items such as a user ID, the date and time of use, a device name, a function, a setting value, and a file name.

A user ID for identifying a user is recorded in the user ID.

The date and time of use of the device 4 (such as the year, month, day, and time) are recorded in the date and time of use.

The device name, the function, and the setting value have the same meaning as the description of FIG. 2.

The file name of a processed object is recorded in the file name.

Figure 4:
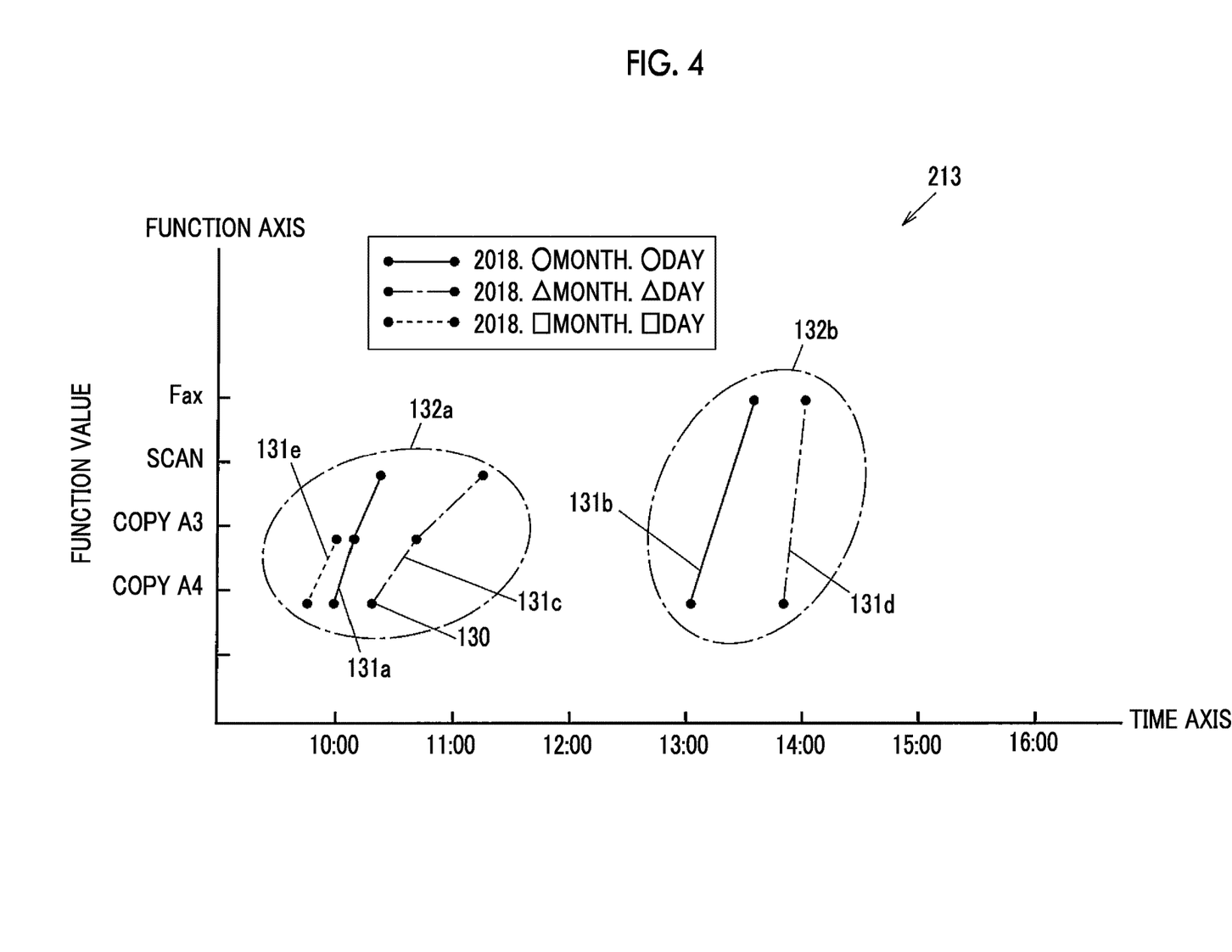
FIG. 4 is a diagram illustrating an example of a distribution chart.

FIG. 4 is a diagram illustrating an example of the distribution chart 213.

The distribution chart 213 represents a user-specific use result by a function axis indicating a function value and a time axis indicating the time of use of the device 4.

In the distribution chart 213 illustrated in the figure, the user ID corresponds to U001.

A function and the setting value thereof constitute the function value.

For example, copy A4 is displayed as the function value in the case of copy function-based printing on A4 paper.

The time of use has year, month, day, and time information.

The time axis has only the time information out of the time of use.

Out of the time of use, those other than the time are provided as parameters.

Figure 5:
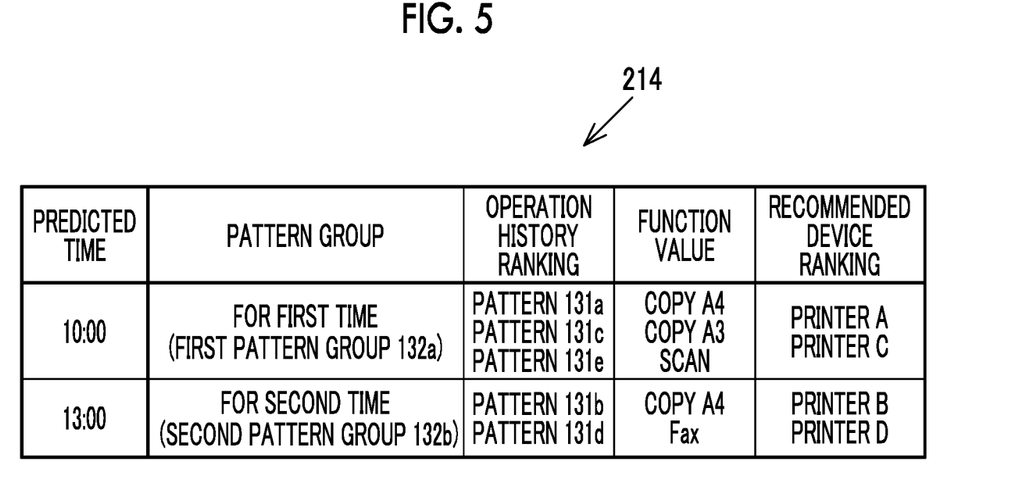
FIG. 5 is a diagram illustrating an example of a recommendation table.

FIG. 5 is a diagram illustrating an example of the recommendation table 214.

The recommendation table has items such as a predicted time, a pattern group, an operation history ranking, a function value, and a recommended device ranking.

Pattern groups 132a and 132b represented in the distribution chart 213 are recorded in the pattern group.

Patterns 131a to 131e (also referred to as "pattern 131" when the patterns 131a to 131e are collectively referred to) belonging to the pattern groups 132a and 132b are recorded in descending order of ranking in the operation history ranking.

The earliest time among the start times of the patterns recorded in the operation history ranking is recorded in the predicted time.

A function value is recorded in the function value.

Printer names capable of executing every function value included in the pattern 131 are recorded in descending order of ranking in the recommended device ranking.

A printer name capable of executing only a part of the plurality of function values included in the pattern 131 may be recorded in the recommended device ranking.

The printer A and a printer C are devices capable of executing copy A4, copy A3, and scan and incapable of executing Fax.

The printer B and a printer D are devices capable of executing copy A4 and Fax and incapable of executing copy A3.

Next, each of the units 200 to 202 of the control unit 20 will be described.

The receiving unit 200 receives the aggregation information transmitted from the aggregation unit 41 of the device 4 at a preset time every day.

The receiving unit 200 records the aggregation information in the device management table 211.

The analysis unit 201 generates the distribution chart 213 as described below.

The analysis unit 201 acquires the use result of one user from the use result DB 212 and plots the use result as a function value 130 on the distribution chart 213.

Next, a plurality of continuous function values are set as the patterns 131a to 131e.

As for whether or not the function values are continuous, the time between the function values 130 being within the time that can be regarded as a time of continuous function use (such as one hour) is regarded as the continuous function values.

In addition, in a case where the plurality of patterns 131 close to one another are present, the analysis unit 201 regards the patterns as a pattern group.

The first pattern group 132a and the second pattern group 132b are present in the case that is illustrated in FIG. 4.

As for whether or not the patterns 131 are close to one another, an index such as a known similarity (such as the cosine similarity) and a distance (such as the Euclidean distance) may be calculated and the determination may be made by comparison between the index and a threshold.

In addition, the analysis unit 201 calculates the operation history ranking and the recommended device ranking based on the distribution chart 213 and records the recommended device ranking in the recommendation table 214.

The operation history ranking and the recommended device ranking may be determined by a weighting that varies with the pattern being given.

The types of the weighting are as follows.

(a) Value Depending on Time of Use

As for the value depending on the time of use, the weighting is increased as the time of use becomes closer to the current time.

For example, the weighting may be "high" in a case where there is a use result on the current day, the weighting may be "medium" in a case where there is a use result on the previous day, and the weighting may be "low" in the case of non-use.

(b) Value Depending on Identity of Object to be Processed by Means of Function

As for the value depending on the identity of an object to be processed by means of the function, the weighting is increased as there is identity such as the same file name.

(c) Value Depending on Position of User

As for the value depending on the position of a user, the weighting is increased as the position becomes closer to the current position of the user.

(d) Value Depending on Frequency of Use of Device

As for the value depending on the frequency of use of the device, the weighting is increased as the frequency of use increases.

(e) Value Depending on Specific Day as Time of Use

As for the value depending on a specific day as the time of use, the pattern of the specific day is given a larger weighting than the pattern of another day.

For example, the weighting may be increased for the same business days starting from the beginning of a month.

The display control unit 202 preferentially displays the device based on the recommended device ranking of the recommendation table 214.

Examples of the mode of the preferential device display may include the array of order in accordance with the ranking (such as a top-to-bottom and left-to-right array) and the size and color of a text.

(Operation of Information Processing Apparatus) Next, an example of the operation of the information processing apparatus 2 will be described with reference to the flowchart of FIG. 7.

For example, once a user with a user ID of U001 access the information processing apparatus 2 by operating the input unit of the user terminal 5 and inputting the user ID (U001) and a password (S1), the display control unit 202 of the information processing apparatus 2 acquires the recommendation table 214 corresponding to the user ID (U001) and illustrated in FIG. 4 from the storage unit 21 (S2).

It is determined whether or not the difference between the current time and the predicted time recorded in the recommendation table 214 is equal to or less than a threshold (such as one hour) (S3).

In a case where the difference is equal to or less than the threshold (S3: Yes), the display control unit 202 reads the recommended device ranking information from the recommendation table 214 (S4).

The display control unit 202 creates a recommendation screen by a Web page in which printer drivers corresponding to the device 4 are arranged in accordance with the read recommended device ranking and performs control so as to display the recommendation screen on the display unit of the user terminal 5 (S5).

Figure 6:
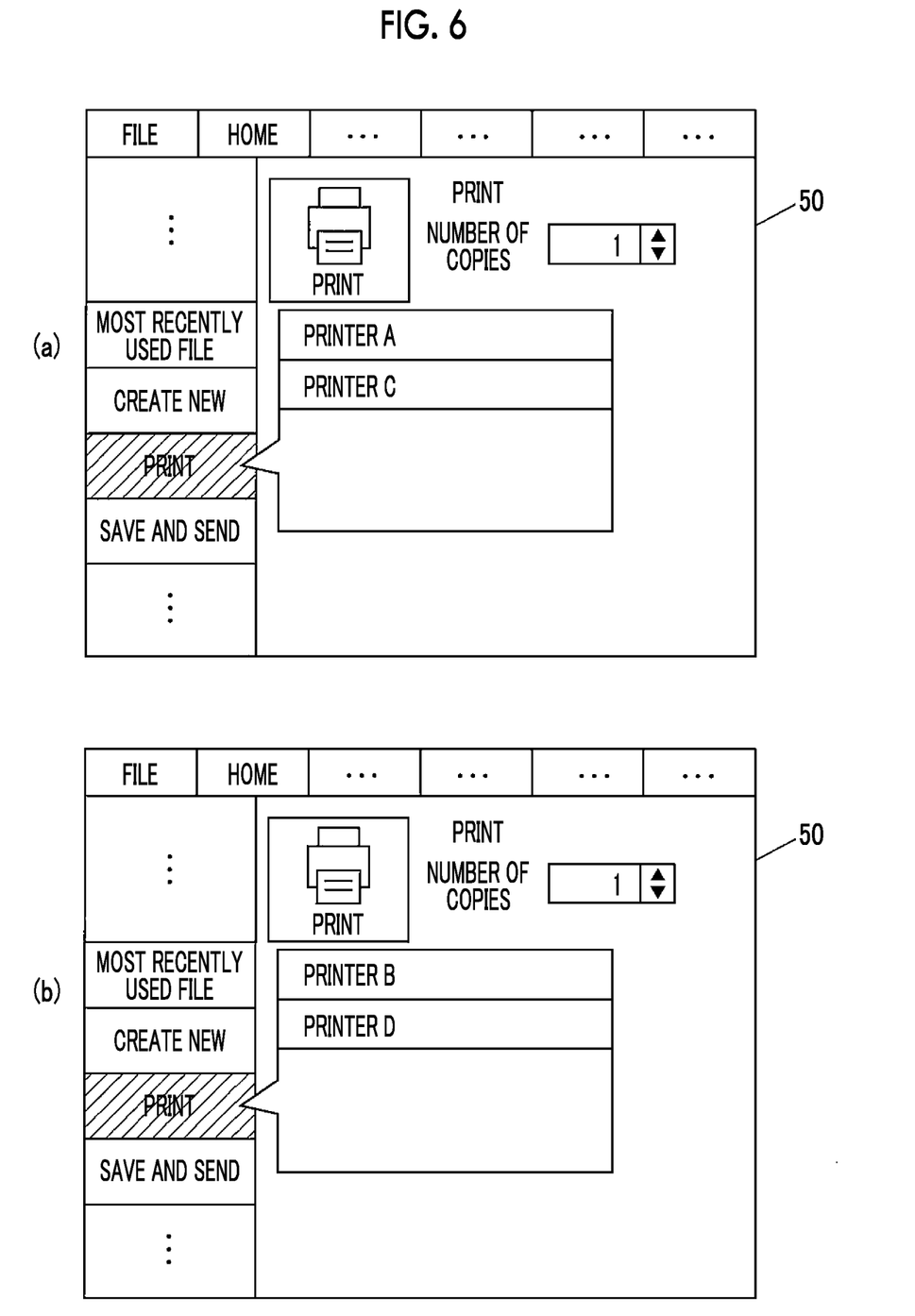
FIGS. 6(a) and 6(b) are diagrams illustrating an example of a recommendation screen.

FIG. 6 is a diagram illustrating an example of a recommendation screen 50.

When printing is selected by a user operating the input unit of the user terminal 5, the control unit transmits the selection information to the information processing apparatus 2.

In a case where the current time is close to 10:00 as the predicted time, the display control unit 202 performs control so as to display the recommendation screen 50 illustrated in FIG. 6(a) on the user terminal 5.

In the recommendation screen 50 illustrated in the figure, the printer A and the printer C are displayed in accordance with the recommended device ranking of the recommendation table 214.

It is determined whether or not the next predicted time is in the recommendation table 214 (S6).

The processing ends in a case where the next predicted time is not in the recommendation table 214 (S6: No).

The processing proceeds to the above-described Step S3 in a case where the next predicted time is in the recommendation table 214 (S6: Yes)

When printing is selected by the user operating the input unit of the user terminal 5 in a case where the recommendation screen 50 is displayed for the second time, the control unit transmits the selection information to the information processing apparatus 2.

In a case where the current time is close to 13:00 as the predicted time, the display control unit 202 performs control so as to display the recommendation screen 50 illustrated in FIG. 6(b) on the user terminal 5.

In the recommendation screen 50 illustrated in the figure, the printer B and the printer D are displayed in accordance with the recommended device ranking of the recommendation table 214.

It can be seen that, as a result of the above, the user with a user ID of U001 can print and fax A4 with the printer B by seeing the recommendation screen 50 illustrated in FIG. 6(b) in a case where the user uses the device 4 for the second time although the user previously printed A4 with the printer A and then faxed the printed A4 with the printer B as illustrated in FIG. 3.

Figure 8:
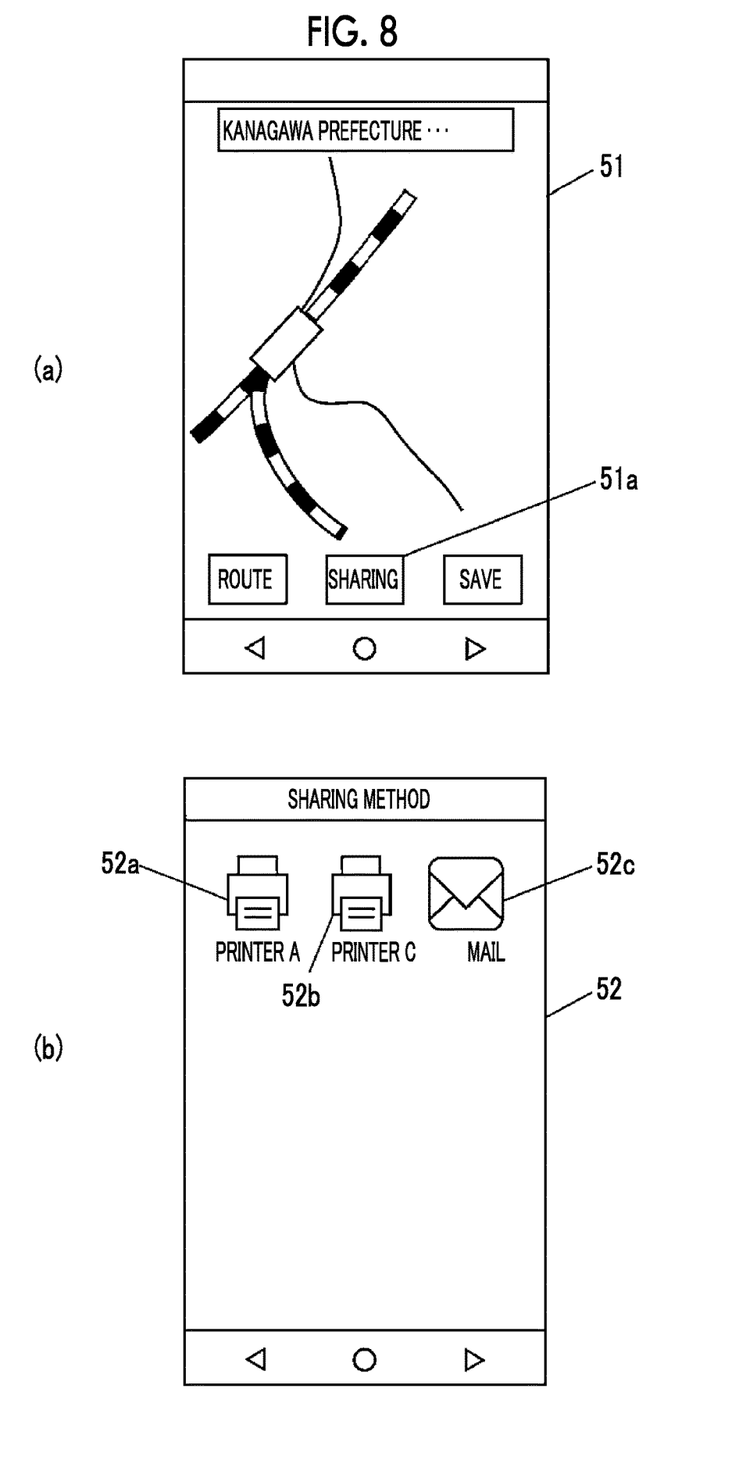
FIG. 8 is a diagram illustrating an example of a screen according to Modification Example 1.

(Modification Example 1) FIG. 8 is a diagram illustrating an example of the display screen of the user terminal according to Modification Example 1. FIG. 8(a) is a diagram illustrating an example of a printing object. FIG. 8(b) is a diagram illustrating an example of a recommendation screen.

In a case where the user terminal 5 is a smartphone or the like, a sharing method recommendation screen 52 is displayed on the display unit once a printing object (such as a map) 51 is displayed on the display unit, a "sharing" button 51a is operated, and a sharing method display request is made as illustrated in FIG. 8(a).

In the recommendation screen 52, an icon 52a of the printer A and an icon 52b of the printer B are displayed from the left to the right in descending order of ranking as printing. Further, an icon 52c of email as another sharing method is displayed.

A user can see from the recommendation screen 52 that the printer A is appropriate for map printing.

Although an embodiment of the present invention has been described above, the embodiment of the present invention is not limited to the above embodiment and various modifications and implementations are possible without departing from the scope of the present invention.

The control unit 20 may be configured partially or entirely by a hardware circuit such as a field programmable gate array (FPGA) and an application specific integrated circuit (ASIC).

It is possible to omit or change some of the components of the above embodiment within the scope of the present invention.

Steps can be added, deleted, changed, replaced, and the like in the flow of the above embodiment within the scope of the present invention.

The non-transitory computer readable medium storing a program used in the above embodiment can be provided by being recorded in a computer readable recording medium such as a CD-ROM.

The non-transitory computer readable medium storing a program used in the above embodiment can be stored in an external server such as a cloud server and used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a storage unit storing, for each user, results of use of respective functions of a plurality of devices; and
 a control unit performing control, in a case where a user-specific use result is represented by a function axis indicating a function value including a used function and a setting value thereof and a time axis indicating a time of use of a device and a pattern group having a plurality of patterns close to one another and including a continuous plurality of function values is present, so as to preferentially display a device to be used next among the plurality of devices based on the pattern group.

2. The information processing apparatus according to claim 1, wherein the control unit performs control so as to preferentially display the device to be used next by giving a weighting varying with the pattern.

3. The information processing apparatus according to claim 2, wherein the weighting is a value depending on a time of use, a value depending on identity of an object to be processed by a function being used, a value depending on a user position, or a value depending on a frequency of device use.

4. The information processing apparatus according to claim 3, wherein a pattern in which a time of use is a specific day is larger in value of the weighting than a pattern of another day.

5. The information processing apparatus according to claim 4, wherein the time axis has a day and time and time is close on different days in the pattern.

6. The information processing apparatus according to claim 5, wherein, in a case where a plurality of the pattern groups are present, the control unit performs control so as to preferentially display the device to be used at respective times corresponding to the plurality of pattern groups.

7. The information processing apparatus according to claim 3, wherein identity of the object is identity of a file name.

8. The information processing apparatus according to claim 7, wherein the time axis has a day and time and time is close on different days in the pattern.

9. The information processing apparatus according to claim 8, wherein, in a case where a plurality of the pattern groups are present, the control unit performs control so as to preferentially display the device to be used at respective times corresponding to the plurality of pattern groups.

10. The information processing apparatus according to claim 3, wherein the time axis has a day and time and time is close on different days in the pattern.

11. The information processing apparatus according to claim 10, wherein, in a case where a plurality of the pattern groups are present, the control unit performs control so as to preferentially display the device to be used at respective times corresponding to the plurality of pattern groups.

12. The information processing apparatus according to claim 3, wherein the control unit performs control so as to preferentially display a device realizing a part of the continuous plurality of the function values.

13. The information processing apparatus according to claim 2, wherein the time axis has a day and time and time is close on different days in the pattern.

14. The information processing apparatus according to claim 13, wherein, in a case where a plurality of the pattern groups are present, the control unit performs control so as to preferentially display the device to be used at respective times corresponding to the plurality of pattern groups.

15. The information processing apparatus according to claim 2, wherein the control unit performs control so as to preferentially display a device realizing a part of the continuous plurality of the function values.

16. The information processing apparatus according to claim 1, wherein the time axis has a day and time and time is close on different days in the pattern.

17. The information processing apparatus according to claim 16, wherein, in a case where a plurality of the pattern groups are present, the control unit performs control so as to preferentially display the device to be used at respective times corresponding to the plurality of pattern groups.

18. The information processing apparatus according to claim 1, wherein the control unit performs control so as to preferentially display a device realizing a part of the continuous plurality of the function values.

19. The information processing apparatus according to claim 1, wherein the control unit performs control so as to preferentially display a device realizing the entirety of the continuous plurality of the function values.

20. A non-transitory computer readable medium storing a program for causing a computer having a storage unit storing, for each user, results of use of respective functions of a plurality of devices to function as a control unit performing control, in a case where a user-specific use result is represented by a function axis indicating a function value including a used function and a setting value thereof and a time axis indicating a time of use of a device and a pattern group having a plurality of patterns close to one another and including a continuous plurality of function values is present, so as to preferentially display a device to be used next among the plurality of devices based on the pattern group.

* * * * *